US012272491B2

(12) United States Patent
Yamamoto et al.

(10) Patent No.: US 12,272,491 B2
(45) Date of Patent: Apr. 8, 2025

(54) IRON-BASED POWDER FOR DUST CORES AND DUST CORE

(71) Applicant: JFE STEEL CORPORATION, Tokyo (JP)

(72) Inventors: Naoki Yamamoto, Tokyo (JP); Takuya Takashita, Tokyo (JP); Makoto Nakaseko, Tokyo (JP); Akio Kobayashi, Tokyo (JP); Shigeru Unami, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 858 days.

(21) Appl. No.: 17/310,961

(22) PCT Filed: Feb. 10, 2020

(86) PCT No.: PCT/JP2020/005168

§ 371 (c)(1),
(2) Date: Sep. 2, 2021

(87) PCT Pub. No.: WO2020/179377

PCT Pub. Date: Sep. 10, 2020

(65) Prior Publication Data

US 2022/0044859 A1 Feb. 10, 2022

(30) Foreign Application Priority Data

Mar. 6, 2019 (JP) ................................ 2019-040805

(51) Int. Cl.

| | |
|---|---|
| ***H01F 3/08*** | (2006.01) |
| ***B22F 1/00*** | (2022.01) |
| ***B22F 1/052*** | (2022.01) |
| ***B22F 1/065*** | (2022.01) |
| ***B22F 1/16*** | (2022.01) |
| ***B22F 3/00*** | (2021.01) |
| ***B22F 3/02*** | (2006.01) |
| ***B22F 3/24*** | (2006.01) |
| ***H01F 1/26*** | (2006.01) |
| ***H01F 27/255*** | (2006.01) |

(52) U.S. Cl.

CPC .................. *H01F 3/08* (2013.01); *B22F 1/00* (2013.01); *B22F 1/052* (2022.01); *B22F 1/065* (2022.01); *B22F 1/16* (2022.01); *B22F 3/00* (2013.01); *B22F 3/02* (2013.01); *B22F 3/24* (2013.01); *H01F 1/26* (2013.01); *H01F 27/255* (2013.01); *B22F 2003/242* (2013.01)

(58) Field of Classification Search

CPC .. B22F 1/00; B22F 1/052; B22F 1/065; B22F 1/16; B22F 2003/242; H01F 1/24

See application file for complete search history.

(56) References Cited

U.S. PATENT DOCUMENTS

| | | | |
|---|---|---|---|
| 8,123,874 | B2 | 2/2012 | Ishimine et al. |
| 2010/0044618 | A1 | 2/2010 | Ishimine et al. |
| 2012/0048063 | A1 | 3/2012 | Maetani et al. |
| 2021/0313101 | A1 | 10/2021 | Yamamoto et al. |

FOREIGN PATENT DOCUMENTS

| | | | | |
|---|---|---|---|---|
| CN | 101534979 | A | 9/2009 | |
| CN | 101578669 | A | 11/2009 | |
| CN | 112534076 | A | 3/2021 | |
| EP | 2154694 | A1 * | 2/2010 | ............ B22F 1/0014 |
| EP | 3831975 | A1 | 6/2021 | |
| JP | S6123702 | A | 2/1986 | |
| JP | H07249510 | A | 9/1995 | |
| JP | 2004143595 | A | 5/2004 | |
| JP | 2005035846 | A | 2/2005 | |
| JP | 2006283166 | A | 10/2006 | |
| JP | 2006283167 | A | 10/2006 | |
| JP | 2009068111 | A | 4/2009 | |
| JP | 2009070914 | A | 4/2009 | |
| JP | 2009200325 | A | 9/2009 | |
| JP | 2012238866 | A | 12/2012 | |
| JP | 5368686 | B2 | 12/2013 | |
| JP | 2014160828 | A | 9/2014 | |
| JP | 2017054910 | A | 3/2017 | |
| JP | WO2020026949 | A1 | 8/2020 | |
| JP | 6865860 | B2 | 4/2021 | |
| WO | 2018179812 | A1 | 10/2018 | |
| WO | 2020026949 | A1 | 2/2020 | |

OTHER PUBLICATIONS

Sep. 29, 2022, Office Action issued by the China National Intellectual Property Administration in the corresponding Chinese Patent Application No. 202080018397.0 with English language search report.

Mar. 10, 2020, International Search Report issued in the International Patent Application No. PCT/JP2020/005168.

31, 2022, Office Action issued by the Canadian Intellectual Property Office in the corresponding Canadian Patent Application No. 3,132,294.

Oct. 5, 2022, Notification of Reasons for Revocation issued by the Japan Patent Office in the corresponding Japanese Patent No. 6969677 with English language concise statement of relevance.

Japan Society of Powder and Powder Metallurgy, Powder and Powder Metallurgy Handbook, Nov. 10, 2010, Uchida Rokakuho Publishing with a partial English translation.

Japanese Patent Application No. 2018144278 filed on Jul. 31, 2018 in the name of JFE Steel Corporation and Tokin Corporation (corresponds to US2021/0313101A1 which was previously submitted on Nov. 11, 2022).

(Continued)

*Primary Examiner* — Anthony M Liang
*Assistant Examiner* — Jacob J Gusewelle
(74) *Attorney, Agent, or Firm* — KENJA IP LAW PC

(57) ABSTRACT

Provided is an iron-based powder for dust cores that has high apparent density and enables producing dust cores having high green density. An iron-based powder for dust cores comprises a maximum particle size of 1 mm or less, wherein a median circularity of particles constituting the iron-based powder for dust cores is 0.40 or more, and a uniformity number in Rosin-Rammler equation is 0.30 or more and 90.0 or less.

13 Claims, No Drawings

(56) References Cited

OTHER PUBLICATIONS

Koichiro Sekimoto et al., Effect of Jet Shape on Characteristics of Atomized Metal Powder by High-Pressure Water Atomization, Technical Paper, Denki-Seiko, Jun. 16, 2017, vol. 88, No. 1.

Takuya Takashita et al., Influence of Particle Shape on Microstructure and Magnetic Properties of Iron Powder Cores, Materials Transactions, Sep. 30, 2016, pp. 1859-1867, vol. 57, No. 11.

Mar. 30, 2022, the Extended European Search Report issued by the European Patent Office in the corresponding European Patent Application No. 20766599.3.

* cited by examiner

IRON-BASED POWDER FOR DUST CORES AND DUST CORE

TECHNICAL FIELD

The present disclosure relates to an iron-based powder for dust cores, and a dust core formed using the iron-based powder for dust cores.

BACKGROUND

Powder metallurgical techniques have high dimensional accuracy even in production of parts of complex shapes and also waste little raw materials, as compared with smelting techniques. Powder metallurgical techniques are thus used in production of various parts. An example of products yielded by powder metallurgical techniques is a dust core. The dust core is a magnetic core produced by pressing a powder, and is used in an iron core of a motor and the like.

In recent years, motors having excellent magnetic properties are needed particularly in hybrid automobiles and electric automobiles for size reduction and cruising distance improvement, and dust cores used are required to have better magnetic properties. Hence, dust cores produced by coating ferromagnetic metal powders having high magnetic flux density and low iron loss with insulating coatings and pressing the coated ferromagnetic metal powders are put to actual use.

To produce a dust core having high magnetic flux density and low iron loss, the compressed density (green density) which is the density of a green compact obtained as a result of pressing needs to be increased. In view of this, methods of improving the green density are proposed.

For example, JP S61-023702 A (PTL 1) proposes a powder for powder metallurgy obtained by mixing particles in three particle size ranges at respective predetermined ratios. According to PTL 1, the powder for powder metallurgy has excellent compressibility, and therefore can achieve high green density. PTL 1 also describes making, from among the powders contained in the powder for powder metallurgy, the particle shape of a fine powder of 1 μm to 20 μm in particle size spherical, thus further improving the compressibility of the powder.

It is known that the apparent density and the green density of a powder used in production of a green compact strongly correlate with each other, and a powder having higher apparent density provides higher green density. Hence, techniques for improving the apparent density of a powder are proposed.

For example, JP 2006-283167 A (PTL 2) and JP 2006-283166 A (PTL 3) each propose an iron-based powder for powder metallurgy having an apparent density of 4.0 $g/cm^3$ to 5.0 $g/cm^3$.

CITATION LIST

Patent Literature

PTL 1: JP S61-023702 A
PTL 2: JP 2006-283167 A
PTL 3: JP 2006-283166 A

SUMMARY

Technical Problem

PTL 1 focuses on only the particle shape of a fine powder in order to further enhance the compressibility, and does not take the particle shape of a coarse powder into consideration. Actually, the shape of the coarse powder affects the friction between the coarse particles and the fine particles, too. Thus, for improvement in the apparent density of the powder, it is insufficient to consider only the shape of the fine powder.

With the techniques proposed in PTL 2 and PTL 3, after classifying the powder into a plurality of fractions of different particle sizes, the powders of the different particle sizes need to be mixed at specific ratios, in order to control the apparent density of the powder. When mixing the powders of the different particle sizes, coarse particles or fine particles coagulate depending on the mixing conditions. This makes it impossible to achieve desired apparent density.

It could therefore be helpful to provide an iron-based powder for dust cores that has high apparent density and thus enables producing dust cores having high green density. It could also be helpful to provide a dust core that has excellent magnetic properties (low iron loss and high saturation magnetic flux density).

Solution to Problem

As a result of intensive studies, we discovered that the problem stated above could be solved by controlling both the median circularity of particles and the uniformity number in the Rosin-Rammler equation. The present disclosure is based on this discovery. We thus provide the following.

1. An iron-based powder for dust cores, comprising a maximum particle size of 1 mm or less, wherein a median circularity of particles constituting the iron-based powder for dust cores is 0.40 or more, and a uniformity number in the Rosin-Rammler equation is 0.30 or more and 90.0 or less.

2. The iron-based powder for dust cores according to 1., satisfying at least one of: a condition (A) that the median circularity is 0.70 or more and the uniformity number is 0.30 or more and 90.0 or less; and a condition (B) that the median circularity is 0.40 or more and the uniformity number is 0.60 or more and 90.0 or less.

3. The iron-based powder for dust cores according to 1. or 2., wherein the maximum particle size is 400 μm or less.

4. The iron-based powder for dust cores according to any one of 1. to 3., comprising an insulating coating on surfaces of the particles constituting the iron-based powder for dust cores.

5. A dust core formed using the iron-based powder for dust cores according to 4.

Advantageous Effect

It is thus possible to provide an iron-based powder for dust cores that has high apparent density and thus enables producing dust cores having high green density. The iron-based powder for dust cores can be produced without classifying powders and mixing them at specific ratios, unlike the powders proposed in PTL 2 and PTL 3. A dust core obtained using the iron-based powder for dust cores has excellent magnetic properties (low iron loss and high saturation magnetic flux density).

DETAILED DESCRIPTION

One of the disclosed embodiments will be described below. The following description concerns one of the preferred embodiments, and the present disclosure is not limited by the following description.

[Iron-Based Powder for Dust Cores]

An iron-based powder for dust cores (hereafter also referred to as "iron-based powder") according to one of the disclosed embodiments is an iron-based powder for dust cores comprising a maximum particle size of 1 mm or less, wherein a median circularity of particles constituting the iron-based powder for dust cores is 0.40 or more, and a uniformity number in Rosin-Rammler equation is 0.30 or more and 90.0 or less. Herein, the term "iron-based powder" denotes a metal powder containing 50 mass % or more Fe.

As the iron-based powder for dust cores, one or both of an iron powder and an alloy steel powder may be used. Herein, the term "iron powder" denotes a powder consisting of Fe and inevitable impurities. In this technical field, the iron powder is also called a pure iron powder. The term "alloy steel powder" denotes a powder containing at least one alloying element with the balance consisting of Fe and inevitable impurities. As the alloy steel powder, for example, a pre-alloyed steel powder may be used. As the alloying element contained in the alloy steel powder, for example, one or more selected from the group consisting of Si, B, P, Cu, Nb, Ag, and Mo may be used. The contents of such alloying elements are not limited, but preferably the Si content is 0 at % to 8 at %, the P content is 0 at % to 10 at %, the Cu content is 0 at % to 2 at %, the Nb content is 0 at % to 5 at %, the Ag content is 0 at % to 1 at %, and the Mo content is 0 at % to 1 at %.

(Maximum Particle Size)

The maximum particle size of the iron-based powder for dust cores is 1 mm or less. If a particle of more than 1 mm in particle size is contained in the iron-based powder, the loss due to eddy current generated in the particle is significant, so that the iron loss of the dust core increases. The maximum particle size is preferably 400 μm or less. In other words, the iron-based powder for dust cores according to one of the disclosed embodiments contains no particle of more than 1 mm in particle size (i.e., the volume fraction of particles of more than 1 mm in particle size is 0%). Preferably, the iron-based powder for dust cores contains no particle of more than 400 μm in particle size (i.e., the volume fraction of particles of more than 400 μm in particle size is 0%).

No lower limit is placed on the maximum particle size. However, if the iron-based powder is excessively fine, coagulation tends to occur, making it difficult to form a uniform insulating coating. Accordingly, the maximum particle size is preferably 1 μm or more, and more preferably 10 μm or more, from the viewpoint of preventing coagulation. The maximum particle size can be measured by a laser diffraction particle size distribution measuring device.

(Circularity)

In one of the disclosed embodiments, the median circularity of the particles constituting the iron-based powder for dust cores is 0.40 or more. When the circularity is higher, that is, when the particle shape is closer to spherical, the contact area between particles is smaller, and mechanical entanglement which is one of the factors causing adhesion between particles is reduced, so that the friction between particles is reduced. By limiting the median circularity to 0.40 or more, the apparent density, i.e., the density in natural filling, can be improved. Moreover, if the median circularity is 0.40 or more, not only the movement of particles is facilitated when charging the powder into a die, but also the friction between the particles and between the particles and the wall surface of the die during pressing is reduced, and consequently high green density can be achieved. The median circularity is preferably 0.50 or more, more preferably 0.60 or more, further preferably 0.70 or more, and most preferably 0.80 or more.

From the viewpoint of enhancing the green density, higher median circularity is better. Hence, no upper limit is placed on the circularity. By definition, however, the upper limit of the circularity is 1. Therefore, the median circularity may be 1 or less. The average circularity is significantly affected by the values of particles having high circularity, and is not suitable as an index indicating the circularity of the whole powder. Accordingly, the median circularity is used in the present disclosure.

The circularity of each particle in the iron-based powder for dust cores and its median value can be measured by the following method. First, the iron-based powder is observed using a microscope, and the projected area A ($m^2$) and the peripheral length P (m) of each individual particle included in the observation field are measured. The circularity φ (dimensionless) of one particle can be calculated from the projected area A and the peripheral length P of the particle using the following Formula (1):

$$\varphi=4\pi A/P^2 \tag{1}$$

where the circularity φ is a dimensionless number.

The middle value when the obtained circularities φ of the individual particles are arranged in ascending order is taken to be the median circularity $\varphi_{50}$. The number of particles measured is 60,000 or more. More specifically, the median circularity can be calculated by the method described in the EXAMPLES section.

(Uniformity Number)

In the iron-based powder for dust cores according to one of the disclosed embodiments, the uniformity number in the Rosin-Rammler equation is 0.30 or more and 90.0 or less. In other words, the uniformity number calculated from the particle size distribution of the iron-based powder for dust cores using the Rosin-Rammler equation is 0.30 to 90.0. The uniformity number is an index indicating the width of the particle size distribution. A larger uniformity number indicates narrower particle size distribution, i.e., more uniform particle size.

If the uniformity number is excessively small, that is, if the particle sizes of the particles constituting the iron-based powder for dust cores are excessively non-uniform, the number of fine particles adhering to the surfaces of coarse particles increases, and the number of fine particles entering the gaps formed between coarse particles decreases. As a result, the apparent density and the green density decrease. Moreover, if the uniformity number is excessively small, fine particles pass through the gaps formed between coarse particles and are disproportionately located in the lower part, and also fine particles gather in the gaps between coarse particles. This causes considerable particle size segregation. If the uniformity number is excessively large, on the other hand, the particle sizes are excessively uniform, so that the number of fine particles entering the gaps between coarse particles decreases. As a result, the apparent density and the green density decrease. To achieve high apparent density and green density, the uniformity number needs to be 0.30 or more and 90.0 or less. The uniformity number is preferably 2.00 or more, more preferably 10.0 or more, and further preferably 30.0 or more.

The uniformity number n can be calculated by the following method. The Rosin-Rammler equation is one of the equations representing particle size distributions of powders, and is expressed by the following Formula (2):

$$R=100\exp\{-(d/c)^n\} \tag{2}$$

In Formula (2), d (m) is a particle size, R (%) is the volume fraction of particles of particle size d or more, c (m) is a particle size corresponding to R=36.8%, and n (–) is the uniformity number.

Modifying Formula (2) using the natural logarithm yields the following Formula (3). Thus, the slope of a straight line obtained by plotting the value of ln d on the X-axis and the value of ln{ln(100/R)} on the Y-axis is the uniformity number n.

$$\ln\{\ln(100/R)\}=n\times\ln d-n\times\ln c \quad (3).$$

Hence, the uniformity number n can be obtained by linearly approximating, using Formula (3), the particle size distribution of the actual soft magnetic powder measured using a laser diffraction particle size distribution measuring device.

Here, the Rosin-Rammler equation is assumed to hold for the produced powder particles only when the correlation coefficient r of the linear approximation is 0.7 or more, which is typically a range of strong correlation, and its slope is used as the uniformity number. Moreover, to ensure the accuracy of the uniformity number, the particle sizes measured in the powder between the upper limit and the lower limit are divided into ten or more particle size ranges, and the volume fraction in each particle size range is measured by a laser diffraction particle size distribution measuring device and applied to the Rosin-Rammler equation.

(Apparent Density)

As a result of the maximum particle size, the median circularity, and the uniformity number satisfying the respective conditions described above, the iron-based powder for dust cores according to one of the disclosed embodiments has high apparent density. The apparent density is not limited, but the iron-based powder for dust cores according to one of the disclosed embodiments has an apparent density of 2.50 $g/cm^3$ or more. Although no upper limit is placed on the apparent density, the apparent density may be 5.00 $g/cm^3$ or less, and may be 4.50 $g/cm^3$ or less.

The iron-based powder for dust cores preferably further satisfies at least one of the following conditions (A) and (B). As a result of at least one of these conditions being satisfied, a higher apparent density of 3.70 $g/cm^3$ or more can be achieved.

(A) The median circularity is 0.70 or more, and the uniformity number is 0.30 or more and 90.0 or less.

(B) The median circularity is 0.40 or more, and the uniformity number is 0.60 or more and 90.0 or less.

In other words, in the case where the median circularity is 0.70 or more, the uniformity number is preferably 0.30 or more and 90.0 or less. In the case where the median circularity is 0.40 or more and less than 0.70, the uniformity number is preferably 0.60 or more and 90.0 or less.

[Method of Producing Iron-Based Powder]

A method of producing the iron-based powder for dust cores according to one of the disclosed embodiments will be described below. The following description concerns an exemplary production method, and the present disclosure is not limited by the following description.

The method of producing the iron-based powder for dust cores is not limited, and any method may be used. For example, the iron-based powder may be produced by an atomizing method. As the atomizing method, any of a water atomizing method and a gas atomizing method may be used. The iron-based powder may be produced by a method of processing a powder obtained by a grinding method or an oxide reduction method. The iron-based powder for dust cores is preferably an atomized powder, and more preferably a water atomized powder or a gas atomized powder.

The production conditions for the iron-based powder may be controlled to limit the median circularity and the uniformity number to the foregoing ranges. For example, in the case of a water atomizing method, the water pressure of water to be collided with molten steel, the flow ratio of water/molten steel, and the molten steel pouring rate may be controlled in the production. In particular, to limit the median circularity to the foregoing range, the iron-based powder may be produced by a low-pressure atomizing method. The median circularity can also be limited to the foregoing range by processing an irregular-shaped powder obtained by a grinding method, an oxide reduction method, or a typical high-pressure atomizing method and smoothing the particle surfaces. In the case of processing the powder, the particles are work-hardened and are difficult to be compacted. Hence, stress relief annealing is preferably performed after the processing.

In the case where the uniformity number of the produced iron-based powder is less than 0.30, the uniformity number may be increased by removing particles not greater than a certain particle size and particles not less than a certain particle size using a sieve defined in HS Z 8801-1. In the case where the uniformity number is greater than 90.0, the uniformity number may be decreased by mixing an iron-based powder having a median circularity of 0.40 or more and a different particle size or removing particles in a certain particle size range using a sieve.

[Insulating Coating]

The iron-based powder for dust cores according to one of the disclosed embodiments may comprise an insulating coating on the surfaces of the particles constituting the iron-based powder for dust cores. In other words, the powder according to one of the disclosed embodiments may be a coated iron-based powder for dust cores comprising an insulating coating on its surface.

The insulating coating may be any coating. As the insulating coating, for example, one or both of an inorganic insulating coating and an organic insulating coating may be used. As the inorganic insulating coating, a coating containing an aluminum compound is preferable, and a coating containing aluminum phosphate is more preferable. The inorganic insulating coating may be a chemical conversion layer. As the organic insulating coating, an organic resin coating is preferable. As the organic resin coating, for example, a coating containing at least one selected from the group consisting of a silicone resin, a phenol resin, an epoxy resin, a polyamide resin, and a polyimide resin is preferable, and a coating containing a silicone resin is more preferable. The insulating coating may be a single-layer coating, or a multilayer coating composed of two or more layers. The multilayer coating may be a multilayer coating composed of coatings of the same type, or a multilayer coating composed of coatings of different types.

Examples of the silicone resin include SH805, SH806A, SH840, SH997, SR620, SR2306, SR2309, SR2310, SR2316, DC12577, SR2400, SR2402, SR2404, SR2405, SR2406, SR2410, SR2411, SR2416, SR2420, SR2107, SR2115, SR2145, SH6018, DC-2230, DC3037, and QP8-5314 produced by Dow Corning Toray Co., Ltd., and KR-251, KR-255, KR-114A, KR-112, KR-2610B, KR-2621-1, KR-230B, KR-220, KR-285, K295, KR-2019, KR-2706, KR-165, KR-166, KR-169, KR-2038, KR-221, KR-155, KR-240, KR-101-10, KR-120, KR-105, KR-271, KR-282, KR-311, KR-211, KR-212, KR-216, KR-213, KR-217, KR-9218, SA-4, KR-206, ES-1001N, ES-1002T, ES1004, KR-9706, KR-5203, and KR-5221 produced by Shin-Etsu Chemical Co., Ltd. Silicone resins other than above may be used in the present disclosure.

As the aluminum compound, any compound containing aluminum may be used. For example, one or more selected from the group consisting of phosphates, nitrates, acetates, and hydroxides of aluminum are preferable.

The coating containing the aluminum compound may be a coating mainly consisting of the aluminum compound, or a coating consisting of the aluminum compound. The coating may contain a metal compound containing metal other than aluminum. As the metal other than aluminum, for example, one or more selected from the group consisting of Mg, Mn, Zn, Co, Ti, Sn, Ni, Fe, Zr, Sr, Y, Cu, Ca, V, and Ba may be used. As the metal compound containing metal other than aluminum, for example, one or more selected from the group consisting of phosphates, carbonates, nitrates, acetates, and hydroxides may be used. The metal compound is preferably a metal compound soluble in a solvent such as water, and more preferably a water-soluble metal salt.

When the phosphorus content in the coating containing aluminum-containing phosphate or phosphate compound is denoted by P (mol) and the total content of all metal elements is denoted by M (mol), the ratio of P to M, denoted by P/M, is preferably 1 or more and less than 10. If P/M is 1 or more, the chemical reaction on the surface of the iron-based powder during the formation of the coating progresses sufficiently, and the adhesion property of the coating increases. This further improves the strength and insulation properties of the green compact. If P/M is less than 10, no free phosphoric acid remains after the formation of the coating, so that the iron-based powder can be prevented from corrosion. P/M is more preferably 1 to 5. P/M is further preferably 2 to 3, to effectively prevent variation or instability in specific resistance.

In the coating containing aluminum-containing phosphate or phosphate compound, the aluminum content is preferably adjusted to an appropriate range. Specifically, the ratio of the mole number A of aluminum to the total mole number M of all metal elements, denoted by $\alpha$ (=A/M), is preferably more than 0.3 and 1 or less. If $\alpha$ is 0.3 or less, aluminum having high reactivity with phosphoric acid is insufficient, and free phosphoric acid remains unreacted. $\alpha$ is more preferably 0.4 to 1.0, and further preferably 0.8 to 1.0.

The coating weight of the insulating coating is not limited, but is preferably 0.010 mass % to 10.0 mass %. If the coating weight is less than 0.010 mass %, the coating is non-uniform, and the insulation properties decrease. If the coating weight is more than 10.0 mass %, the proportion of the iron-based powder in the dust core decreases, as a result of which the strength and magnetic flux density of the green compact decrease significantly.

The coating weight is a value defined by the following formula:

Coating weight (mass %)=(the mass of the insulating coating)/(the mass of the parts of the iron-based powder for dust cores other than the insulating coating)×100.

The iron-based powder for dust cores according to one of the disclosed embodiments may further comprise a substance different from the insulating coating, at at least one of the following locations: inside the insulating coating; under the insulating coating; and on the insulating coating. Examples of the substance include surfactants for improving wettability, binders for binding between particles, and additives for adjusting pH. The total amount of such substance with respect to the whole insulating coating is preferably 10 mass % or less.

(Method of Forming Insulating Coating)

The method of forming the insulating coating is not limited, and any method may be used. Preferably, the insulating coating is formed by a wet treatment. An example of the wet treatment is a method of mixing a treatment solution for insulating coating formation and the iron-based powder. The mixing is preferably performed, for example, by a method of stirring and mixing the iron-based powder and the treatment solution in a vessel such as an attritor or a Henschel mixer, or a method of supplying and mixing the treatment solution to the iron-based powder fluidized by a tumbling fluidized type coating device or the like. In the supply of the solution to the iron-based powder, the whole amount of the solution may be supplied before or immediately after the start of the mixing, or the solution may be supplied in several batches during the mixing. Alternatively, the treatment solution may be continuously supplied during the mixing using a droplet supply device, a spray, or the like.

More preferably, the treatment solution is supplied using a spray. The use of the spray enables uniform dispersion of the treatment solution over the entire iron-based powder. Moreover, in the case of using the spray, the spray conditions can be adjusted to reduce the diameter of the spray droplets to about 10 μm or less. Consequently, the coating can be prevented from being excessively thick, and a uniform and thin insulating coating can be formed on the iron-based powder. Meanwhile, stirring and mixing using a fluidized vessel such as a fluidized granulator or a tumbling granulator or a stirring type mixer such as a Henschel mixer have the advantage of suppressing coagulation of the powder. Hence, a fluidized vessel or a stirring type mixer and a spray for supplying the treatment solution may be used in combination, to enable formation of a more uniform insulating coating on the iron-based powder. Here, it is advantageous to perform a heat treatment in the mixer or after the mixing, for promoting the drying of the solvent and promoting the reaction.

[Dust Core]

A dust core according to one of the disclosed embodiments is a dust core formed using the iron-based powder for dust cores described above.

The method of producing the dust core is not limited, and any method may be used. For example, the dust core can be obtained by charging the iron-based powder having the insulating coating into a die and pressing the iron-based powder so as to have the desired dimensions and shape.

The pressing is not limited, and may be performed by any method. For example, any of the typical forming methods such as a room temperature forming method and a die lubrication forming method is usable. The forming pressure is determined as appropriate depending on use, but is preferably 490 MPa or more, and more preferably 686 MPa or more.

In the pressing, a lubricant may be optionally applied to the wall surface of the die or added to the iron-based powder. In this way, the friction between the die and the powder during the pressing can be reduced, and a decrease in the green density can be further suppressed. In addition, the friction when removing the green compact from the die can be reduced, so that the green compact (dust core) can be prevented from cracking when removed. Preferable examples of the lubricant include metal soaps such as lithium stearate, zinc stearate, and calcium stearate, and waxes such as fatty acid amide.

The obtained dust core may be subjected to a heat treatment. The heat treatment is expected to have the effect of reducing hysteresis loss by stress relief and increasing the strength of the green compact. The heat treatment conditions may be determined as appropriate. Preferably, the temperature is 200° C. to 700° C., and the time is 5 min to 300 min. The heat treatment may be performed in any atmosphere such as in the air, in an inert atmosphere, in a reducing atmosphere, or in vacuum. During temperature rise or temperature fall in the heat treatment, a stage in which the dust core is held at a certain temperature may be provided.

EXAMPLES

More detailed description will be given below by way of examples. The present disclosure is not limited to the examples described below. Modifications can be appropriately made within the range in which the subject matter of the present disclosure is applicable, with all such modifications being also included in the technical scope of the present disclosure.

First Example

An iron powder (pure iron powder) having a maximum particle size of 1 mm or less was produced by a water atomizing method. The obtained iron powder was subjected to an annealing treatment in hydrogen at 850° C. for 1 hr. When producing the iron powder by the water atomizing method, the temperature of molten steel used and the amount and pressure of water to be collided with the molten steel were varied to produce iron powders different in circularity and uniformity number.

For each iron powder after the annealing treatment, the median circularity, the uniformity number, and the apparent density were evaluated by the following methods.

(Median Circularity)

The median circularity of each obtained powder was measured. In the measurement, first, the powder was dispersed on a glass plate, and observed with a microscope from above to capture an image of the particles. The image was captured for 60,000 or more particles per sample. The captured particle image was taken into a computer and analyzed, and the projected area A of each particle and the peripheral length P of each particle were calculated. The circularity $\varphi$ of each particle was calculated from the obtained projected area A and the peripheral length P, and the median circularity $\varphi_{50}$ was calculated from the circularities of all observed particles.

(Uniformity Number)

Part of each obtained powder was extracted, the powder was dispersed in ethanol, and the volume fraction (volume frequency) at each particle size was measured by laser diffraction particle size distribution measurement. Following this, the following formula, which is obtained by modifying the Rosin-Rammler equation using the natural logarithm, and the value of ln(d) was plotted on the X-axis and the value of ln{ln(100/R)} was plotted on the Y-axis. The plot was linearly approximated, and the slope of the straight line was taken to be the uniformity number. Here, the Rosin-Rammler equation was assumed to hold for the produced powder particles only when the correlation coefficient r of the linear approximation was 0.7 or more, which is typically a range of strong correlation, and its slope was used as the uniformity number n.

$$\ln\{\ln(100/R)\} = n\times\ln(d) - n\times\ln(c).$$

(Apparent Density)

The apparent density of each obtained powder was measured by the test method defined in JIS Z 2504. The measured apparent density was used to evaluate the apparent density based on the following criteria:

excellent: 3.70 g/cm$^3$ or more good: 2.50 g/cm$^3$ or more and less than 3.70 g/cm$^3$ poor: less than 2.50 g/cm$^3$.

(Insulating Coating)

Next, an insulating coating made of a silicone resin (KR-311 produced by Shin-Etsu Chemical Co., Ltd.) was formed on the surface of the iron powder by a wet coating method. Specifically, using a tumbling fluidized bed type coating device, a treatment solution for insulating coating formation was sprayed onto the surface of the iron powder to form an insulating coating, thus yielding a coated iron powder. A silicone resin having resin content of 60 mass % and diluted with xylene was used as the treatment solution for insulating coating formation, and coating was performed so that the coating weight of the insulating coating with respect to the iron powder would be 3 mass %. After the spraying was completed, the fluidized state was maintained for 10 hr for drying. After the drying, a heat treatment was performed at 150° C. for 60 min for resin curing.

(Dust Core)

Each coated iron-based powder was then charged into a die to which lithium stearate had been applied, and pressed to form an annular (toroidal) dust core (outer diameter: 38 mm, inner diameter: 25 mm, height: 6 mm). The forming pressure was 1470 MPa, and the dust core was formed in one operation.

(Green Density)

The green density of each obtained dust core was calculated. The green density was calculated by measuring the mass of the dust core and dividing the mass by the volume calculated from the dimensions of the dust core.

(Magnetic Properties)

A coil was wound around each obtained dust core, and the magnetic flux density at a magnetic field strength of 10000 A/m was measured using a DC magnetic property measuring device produced by Metron Technology Research Co., Ltd. The number of turns of the coil was 100 turns on the primary side and 20 turns on the secondary side. Further, the iron loss at a maximum magnetic flux density of 0.05 T and a frequency of 30 kHz was measured using a high-frequency iron loss measuring device. Using the measured iron loss, the magnetic properties were evaluated based on the following criteria:

excellent: 150 kW/m$^3$ or less good: 151 kW/m$^3$ or more and less than 200 kW/m$^3$ poor: 200 kW/m$^3$ or more.

The evaluation results are shown in Table 1. As can be seen from Comparative Examples 1 and 2 and Example 1, in the case where $\varphi_{50}$ was 0.40 or more and n was 0.30 or more, the powder had an apparent density of 2.50 g/cm$^3$ or more, and high green density was achieved. The dust core obtained using the powder satisfying such conditions had excellent magnetic properties, i.e., a magnetic flux density of 1.6 T or more and an iron loss of 200 kW/m$^3$ or less.

Moreover, as can be seen from a comparison between Examples 3 and 4 and a comparison between Examples 2 and 5, in the case where $\varphi_{50}$ was 0.40 or more and n was 0.60 or more or in the case where $\varphi_{50}$ was 0.70 or more and n was 0.30 or more, the powder had a higher apparent density of 3.70 g/cm$^3$ or more, and higher green density and higher magnetic properties were achieved.

Further, as can be seen from Comparative Example 3 and Example 8, in the case where n was higher than 90.0, the apparent density decreased sharply. This is because the number of fine particles entering the gaps between coarse particles decreased as a result of the particle size being excessively uniform. This demonstrates that n needs to be 90.0 or less.

TABLE 1

| | Coating weight of insulating coating (mass %) | Median circularity $\varphi_{50}$ (–) | Uniformity number n (–) | Apparent density (g/cm³) | Apparent density evaluation | Green density (g/cm³) | Magnetic flux density (T) | Iron loss (kW/m³) | Iron loss evaluation |
|---|---|---|---|---|---|---|---|---|---|
| Comparative Example 1 | 3 | 0.37 | 0.30 | 2.40 | Poor | 5.88 | 1.52 | 215 | Poor |
| Comparative Example 2 | 3 | 0.40 | 0.26 | 2.40 | Poor | 5.93 | 1.53 | 207 | Poor |
| Example 1 | 3 | 0.40 | 0.30 | 2.50 | Good | 6.52 | 1.60 | 195 | Good |
| Example 2 | 3 | 0.69 | 0.30 | 3.25 | Good | 6.72 | 1.61 | 190 | Good |
| Example 3 | 3 | 0.40 | 0.59 | 3.55 | Good | 6.85 | 1.62 | 170 | Good |
| Example 4 | 3 | 0.40 | 0.60 | 3.70 | Excellent | 7.09 | 1.65 | 150 | Excellent |
| Example 5 | 3 | 0.70 | 0.30 | 3.75 | Excellent | 7.15 | 1.66 | 145 | Excellent |
| Example 6 | 3 | 0.80 | 2.50 | 3.96 | Excellent | 7.19 | 1.67 | 138 | Excellent |
| Example 7 | 3 | 0.88 | 30.0 | 4.11 | Excellent | 7.26 | 1.68 | 132 | Excellent |
| Example 8 | 3 | 0.92 | 90.0 | 4.32 | Excellent | 7.38 | 1.69 | 125 | Excellent |
| Comparative Example 3 | 3 | 0.92 | 90.5 | 2.45 | Poor | 5.85 | 1.54 | 203 | Poor |

Second Example

Next, to evaluate the influence of the maximum particle size, iron-based powders for dust cores having the same median circularity and the same uniformity number but different in the ratio of particles of more than 1 mm in particle size were produced, and the eddy current loss was evaluated. The other conditions were the same as in the first example.

(Ratio of Particles of More than 1 mm in Particle Size)

The ratio of particles of more than 1 mm in particle size was measured in the following manner. First, the iron-based powder for dust cores was added to ethanol as a solvent, and dispersed by applying ultrasonic vibration for 1 min to obtain a sample. The sample was then used to measure the particle size distribution of the iron-based powder for dust cores on a volume basis. The measurement was performed using a laser diffraction particle size distribution measuring device (LA-950V2 produced by HORIBA, Ltd.). From the obtained particle size distribution, the ratio of particles of more than 1 mm in particle size was calculated. The ratio of particles of more than 400 μm in particle size was also calculated by the same method. The measurement results are shown in Table 2.

(Eddy Current Loss)

The magnetic properties were measured using a DC magnetic property measuring device in the same manner as in the first example, and the hysteresis loss was calculated from the obtained results. Specifically, the iron loss and the hysteresis loss at a maximum magnetic flux density of 0.05 T and a frequency of 30 kHz were measured, and the value obtained by subtracting the hysteresis loss from the iron loss was taken to be the eddy current loss. Using the obtained eddy current loss, the eddy current loss was evaluated based on the following criteria:

excellent: less than 10 kW/m³ good: 10 kW/m³ or more and less than 50 kW/m³ poor: 50 kW/m³ or more.

The measurement results are shown in Table 2.

As can be seen from a comparison between Comparative Example 4 and Example 9, in the case where the powder contained particles of more than 1 mm in particle size, the eddy current loss was higher than 50 kW/m³, and the magnetic properties were poor. As can be seen from a comparison between each of Examples 9 and 10 and Example 11, in the case where the powder did not contain particles of more than 400 μm in particle size, the eddy current loss was lower.

TABLE 2

| | Coating weight of insulating coating (mass %) | Median circularity $\varphi_{50}$ (–) | Uniformity number n (–) | Ratio of particles of more than 1 mm in particle size (vol %) | Ratio of particles of more than 400 μm in particle size (vol %) | Eddy current loss (kW/m³) | Eddy current loss evaluation |
|---|---|---|---|---|---|---|---|
| Comparative Example 4 | 3 | 0.40 | 0.30 | 3 | 15 | 70 | Poor |
| Example 9 | 3 | 0.40 | 0.30 | 0 | 15 | 20 | Good |
| Example 10 | 3 | 0.40 | 0.30 | 0 | 2 | 15 | Good |
| Example 11 | 3 | 0.40 | 0.30 | 0 | 0 | 5 | Excellent |

Third Example

Next, to evaluate the influence of the coating weight of the insulating coating, iron-based powders for dust cores having a maximum particle size of 1 mm or less and the same median circularity and the same uniformity number but different in coating weight were produced, and the magnetic properties were evaluated. The other conditions and the magnetic property evaluation method were the same as in the first example.

As can be seen from Examples 12 and 13, in the case where the coating weight was 0.010 mass % or more, the insulation properties were improved, as a result of which the iron loss was further improved to 200 kW/m³ or less. As can be seen from Examples 15 and 16, in the case where the coating weight was 10 mass % or less, the magnetic flux density was further improved to 1.6 T or more. Thus, in the case of forming an insulating coating on the surfaces of the particles constituting the iron-based powder for dust cores, the coating weight of the insulating coating is preferably 0.01 mass % to 10 mass %.

TABLE 3

| | Apparent density ($g/cm^3$) | Coating weight of insulating coating (mass %) | Median circularity $\varphi_{50}$ (−) | Uniformity number n (−) | Magnetic flux density (T) | Iron loss ($kW/m^3$) |
|---|---|---|---|---|---|---|
| Example 12 | 2.50 | 0.007 | 0.40 | 0.30 | 1.60 | 900 |
| Example 13 | 2.50 | 0.010 | 0.40 | 0.30 | 1.60 | 198 |
| Example 14 | 2.50 | 3.00 | 0.40 | 0.30 | 1.60 | 195 |
| Example 15 | 2.50 | 10.00 | 0.40 | 0.30 | 1.61 | 197 |
| Example 16 | 2.50 | 10.30 | 0.40 | 0.30 | 1.45 | 196 |

The invention claimed is:

1. An iron-based powder for dust cores, comprising a maximum particle size of 1 mm or less, wherein a median circularity of particles constituting the iron-based powder for dust cores is 0.40 or more, and a uniformity number in Rosin-Rammler equation for the particles constituting the iron-based powder for dust cores is 0.30 or more and 90.0 or less.

2. The iron-based powder for dust cores according to claim 1, satisfying at least one of: a condition (A) that the median circularity is 0.70 or more and the uniformity number is 0.30 or more and 90.0 or less; and a condition (B) that the median circularity is 0.40 or more and the uniformity number is 0.60 or more and 90.0 or less.

3. The iron-based powder for dust cores according to claim 1, wherein the maximum particle size is 400 μm or less.

4. The iron-based powder for dust cores according to claim 1, comprising an insulating coating on surfaces of the particles constituting the iron-based powder for dust cores.

5. A dust core formed using the iron-based powder for dust cores according to claim 4.

6. The iron-based powder for dust cores according to claim 2, wherein the maximum particle size is 400 μm or less.

7. The iron-based powder for dust cores according to claim 2, comprising an insulating coating on surfaces of the particles constituting the iron-based powder for dust cores.

8. The iron-based powder for dust cores according to claim 3, comprising an insulating coating on surfaces of the particles constituting the iron-based powder for dust cores.

9. The iron-based powder for dust cores according to claim 6, comprising an insulating coating on surfaces of the particles constituting the iron-based powder for dust cores.

10. A dust core formed using the iron-based powder for dust cores according to claim 7.

11. A dust core formed using the iron-based powder for dust cores according to claim 8.

12. A dust core formed using the iron-based powder for dust cores according to claim 9.

13. The iron-based powder for dust cores according to claim 1, wherein the median circularity of the particles constituting the iron-based powder for dust cores is 0.40 or more and 0.70 or less.

* * * * *